United States Patent [19]

Jackson et al.

[11] Patent Number: 4,557,444
[45] Date of Patent: Dec. 10, 1985

[54] AEROSPACE VEHICLE

[75] Inventors: L. Robert Jackson; Allan H. Taylor, both of Newport News, Va.

[73] Assignee: The United States of America as represented by the Administrator of the National Aeronautics and Space Administration, Washington, D.C.

[21] Appl. No.: 569,371

[22] Filed: Jan. 9, 1984

[51] Int. Cl.4 .......................... B64G 1/40; B64G 1/58
[52] U.S. Cl. ................................ 244/172; 244/158 R; 244/158 A
[58] Field of Search ............. 244/158 R, 158 A, 159, 244/54, 160, 162, 172, 2; 102/345, 352, 360, 377; 114/74 R, 74 A

[56] References Cited

U.S. PATENT DOCUMENTS

| 2,504,422 | 4/1950 | Johnson et al. | 244/74 |
| 2,539,960 | 1/1951 | Marchant et al. | 244/54 |
| 2,977,077 | 3/1961 | Pearson | 244/118 |
| 3,017,137 | 1/1962 | Helmke et al. | 244/2 |
| 3,024,941 | 3/1962 | Vandenberg | 220/63 |
| 3,147,936 | 9/1964 | Mercille | 244/162 |
| 3,194,515 | 7/1965 | Cohan | 244/54 |
| 3,262,655 | 7/1966 | Gillespie, Jr. | 244/172 |
| 3,295,791 | 1/1967 | Black | 244/162 |
| 3,334,845 | 8/1967 | Ricard | 244/120 |
| 3,675,376 | 7/1972 | Belew | 244/158 R |
| 3,731,893 | 5/1973 | Stalmach, Jr. | 244/158 A |
| 3,793,861 | 2/1974 | Burkhard et al. | 62/315 |
| 3,814,350 | 6/1974 | Fletcher et al. | 244/158 R |
| 3,815,849 | 6/1974 | Meston | 244/160 |
| 3,955,784 | 5/1976 | Salkeld | 244/172 |
| 4,193,828 | 3/1980 | Moores et al. | 156/148 |

FOREIGN PATENT DOCUMENTS

| 763292 | 7/1967 | Canada | 244/160 |
| 1044780 | 10/1966 | United Kingdom | 244/172 |

OTHER PUBLICATIONS

Reusable Launch Systems, "Astronautics", Jan. 1963, by Leonard M. Tinnan, pp. 50-56.

Primary Examiner—Galen L. Barefoot
Assistant Examiner—Rodney Corl
Attorney, Agent, or Firm—Howard J. Osborn; John R. Manning; Wallace J. Nelson

[57] ABSTRACT

A dual structure aerospace vehicle 10 having an aeroshell structure 11 and an internally disposed separable and reusable integral tank/thrust structure 13 is disclosed. Tank/thrust structure 13 is insulated for cryogenic fuels and the cavity 24 within aeroshell 11 is insulated from the tank/thrust structure (FIG. 2). An internal support ring 26 within cavity 24 serves as attachment for lugs 30 on tank/thrust structure 13 via double hinges 50 (FIGS. 3 and 4). The aft end of tank/thrust structure 13 is provided with rocket engines and exit nozzles 33, 34, 35 with trunnion support 37 supporting the tank/thrust structure within aeroshell 11.

8 Claims, 6 Drawing Figures

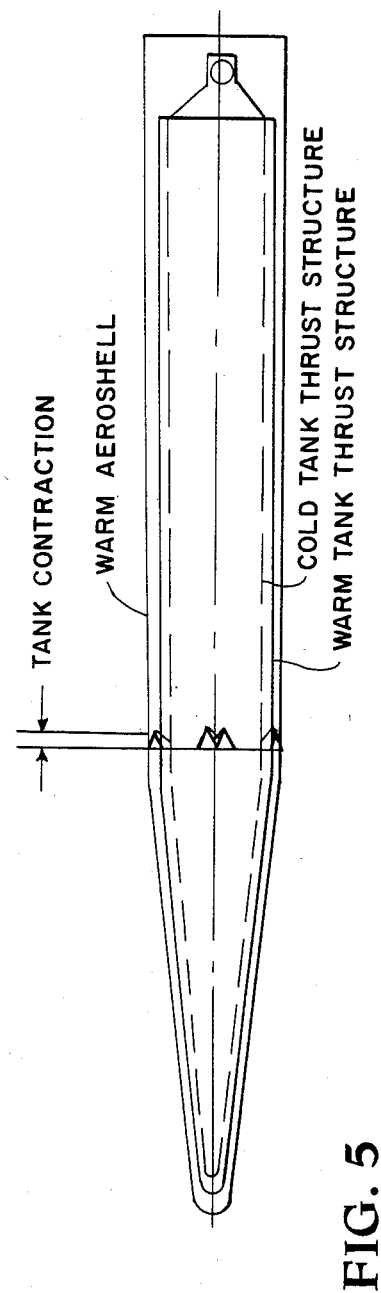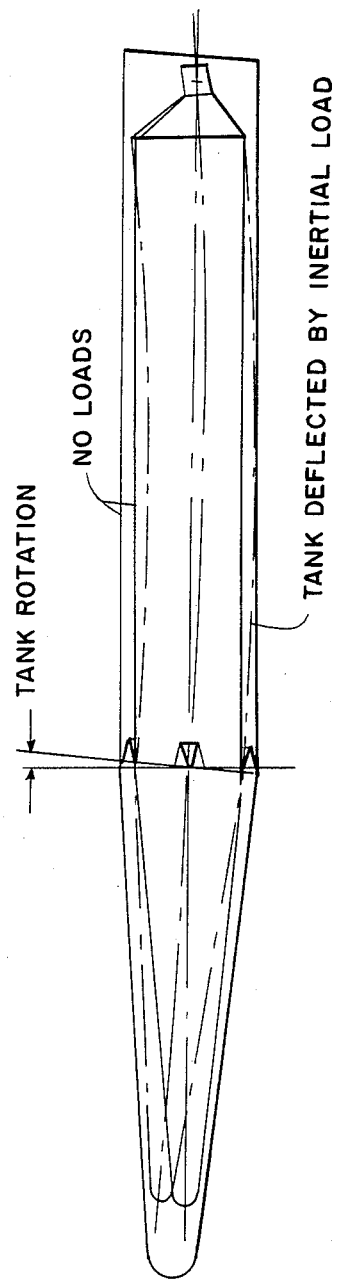
FIG. 5
FIG. 6

AEROSPACE VEHICLE

The invention described herein was made by employees of the U.S. Government and may be manufactured and used by or for the Government for governmental purposes without the payment of any royalties thereon or therefor.

BACKGROUND OF THE INVENTION

This invention relates generally to aerospace vehicular structures and relates in particular to a dual structure aerospace vehicle having a reusable aeroshell structure and an internally disposed separable and reusable integral tank/thrust structure.

Future space transportation systems presently being studied to identify technology needs for timely development have the minimum goals of all weather operational capability, and durable structures and systems to minimize refurbishment, maintenance and cost. In the continuous research and development for improved vehicles useful in space exploration and meeting these goals, two basic structural arrangements have been employed, to wit, integral tank structural arrangements and non-integral tank structural arrangements. In the integral tank structural arrangements previously employed, the propellant tank(s) also serve as the airframe structure and support for the propulsion system. This arrangement is structurally the more efficient of the two because little redundant structure is required and the load path for the rocket thrust is near optimum. All current expendable rocket propelled space launch vehicles employ the integral tank arrangement, e.g., Atlas, Centaur, Titan and the Saturn systems.

In the non-integral tank arrangement, the propellant tank or tanks are supported within a separate airframe structure. The airframe structure carries the rocket thrust in this system through the fuselage and then into the tank(s) through the tank rear suspension system. This arrangement is structurally less efficient than an integral tank arrangement in that it has two independent structures; one for the tank(s) and one for the fuselage of the airframe, resulting in a much less efficient load path for the rocket thrust. This non-integral tank arrangement is used on the current space shuttle system and several of the X-series rocket propelled aircraft.

In each of these prior art systems when an insulated structural wall is employed, there are many disadvantages. For reuse, an integral tank system requires a cumbersome thermal protection utilizing hundreds of heat shielding tiles. The tile system must be fastened to the tank(s) but must be readily removable for tank inspection and maintenance. The current art thermal protection system is cumbersome and requires a large number of individually constructed small ceramic and/or metallic tiles which are not readily removed. Also, the thermal protection tiles do not always provide the weather resistant surface required for an all weather operation. That is, rain may erode the system or cause moisture to be entrained between the individual tiles posing operational problems. Further, because the current art thermal protection systems consist of numerous individual tiles with joint gaps, steps and bowing of tiles, they may provide an unacceptable surface roughness which could cause excessive heating or aerodynamic drag.

An additional disadvantage of the integral tank structural arrangement is that, since the thermal protection system forms the external mold line of the airframe, standoff supports for the thermal protection system must be located in areas where the integral tank wall is not in proximity of the aerodynamic surface. Also, reusable space launch vehicles require relatively high lift to drag ratios to survive the reentry environment and land which mandates wings. The wing structure must be discretely attached to the integral tank structure which compromises the tank structural efficiency. When cryogenic propellants are employed, the wing structure must be simply supported on the tank with some of the supports free to move to accommodate thermal growth and prevent excessive thermal stress. Such point load supports increase the weight of the wing over that of the wings which can be directly attached to the fuselage such as with the non-integral tank structural arrangement.

Prior art non-integral tank structural arrangements are inherently inefficient due to the redundant dual structure and poor load path for reacting thrust loads. Also, a structural joint that enables separation of the fuselage into two sections is required in the non-integral tank arrangement to provide access to the tank(s) for inspection and maintenance.

Accordingly, it is an object of the present invention to provide a novel aerospace vehicle structural arrangement employing an airframe (aeroshell) structure and a separate integral tank/thrust structure that minimizes the disadvantages of the prior art systems while maximizing the advantages thereof.

It is a further object of the present invention to provide a lightweight rocket propelled reusable aerospace vehicle having a structural arrangement that has low life cycle cost, provides all weather operational flexibility, economical long life structure and is easily inspected and maintained.

An additional object of the present invention is an aerospace vehicle having an aeroshell structure and a separate integral tank/thrust structure releasably contained therein that is readily removable for inspection and maintenance.

The foregoing and additional objects are attained according to the present invention by providing an aerospace vehicle consisting of an airframe or aeroshell structure and a separable integral tank/thrust structure. The aeroshell structure of the present invention, and like the presently used non-integral tank structural arrangements, can use either hot or insulated wall construction because the propellant tank(s) is/are simply supported inside the aeroshell structure. The present invention, unlike non-integral tank arrangements uses aft-trunnions and forward peripheral hinges that are ball-jointed to the tank/thrust structure. Moreover, in the present invention the rocket propulsion system is attached directly to the propellant tank(s) through a conical thrust structure which provides a near optimum load path for the thrust. The aeroshell in the preferred embodiment of the present invention utilizes a hot structure which provides a smooth impervious surface for all weather operational flexibility while eliminating the external thermal protection system requirement. The aeroshell structure is readily removed from the tank/thrust structure for inspection and maintenance by disconnecting the forward peripheral hinge and aft trunnion supports and lifting the airframe up when the vehicle is in a vertical takeoff attitude. When the vehicle is in a horizontal takeoff attitude the aeroshell is separable from the tank structure by moving the aeroshell forward while providing support for the tank/thrust structure through the payload bay, as well as, at the base of the vehicle.

BRIEF DESCRIPTION OF THE DRAWINGS

A more complete appreciation of the invention and many of the attendant advantages thereof will be more readily apparent as the same becomes better understood by reference to the following detailed description when considered in connection with the accompanying drawings wherein:

FIG. 5 is a schematic illustration of the relative movement of the tank/thrust structure within the aeroshell cavity due to thermal changes; and FIG. 6 is a schematic illustration of the tank/thrust deflection relative to the aeroshell structure in response to aero-inertial loads.

DETAILED DESCRIPTION OF THE DISCLOSURE

Figure 1:
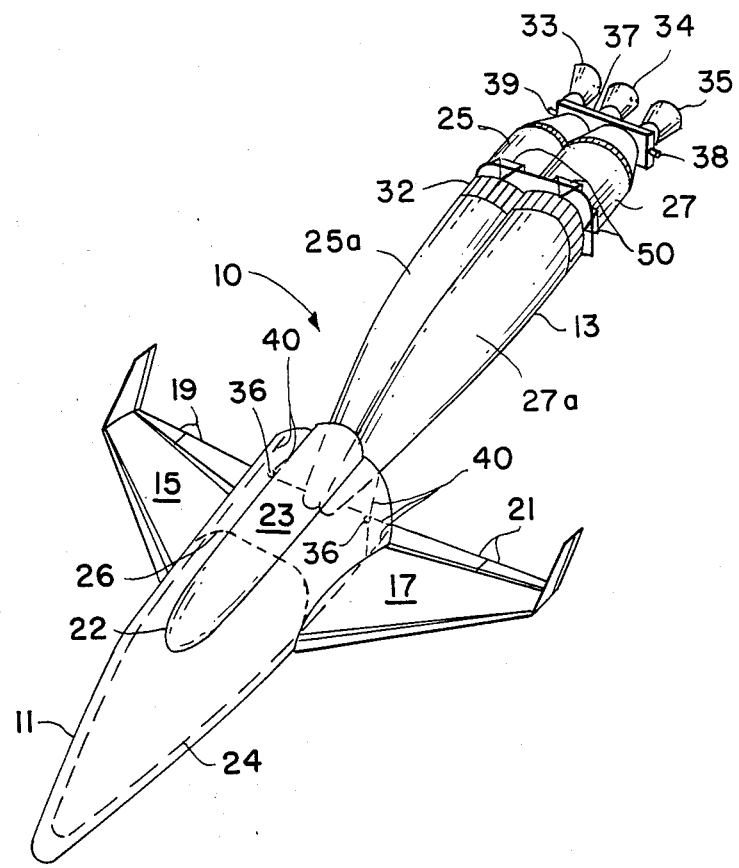
FIG. 1 is a part schematic, exploded view of the aeroshell structural arrangement and the integral, removable tank/thrust structure according to the present invention.

Referring now to the drawings, FIG. 1 illustrates (in an exploded schematic view) an exemplary aerospace vehicle generally designated by reference numeral 10 and including aeroshell structure 11 and tank/thrust structure 13. Aeroshell structure 11 is provided with a similar exterior configuration to that of present space shuttle vehicles and includes wings 15, 17, aft flight control surfaces 19, 21, a crew canopy 22 and cargo or payload bay 23 shown mounted on the upper surface of the vehicle, but which may be nested in the body and thereby become part of the integral tank/thrust structure. An interior cavity 24 (illustrated in dotted line) is provided beneath the canopy and payload area and along the length of aeroshell structure 11 to receive tank/thrust structure 13. A support ring or frame 26 is provided within cavity 24 and along the periphery thereof. Support frame 26 serves to support and secure forward peripherial hinges 50 having ends that are ball-jointed connected to lugs secured to tank/thrust structure 13, as will be further explained hereinafter.

In the illustrated embodiment, tank/thrust structure 13 is formed of two intersecting circular tanks 25, 27, each of which is provided with conical thrust engine structure, leading to a plurality of rocket engines and exhaust nozzles 33, 34, 35. An inter-tank adaptor 32 is disposed circumferentially around the tank(s) of tank/thrust structure 13 to serve as a structural connection between tanks 25, 27 and adjacent tanks 25a, 27a, required when more than one propellant is used.

An aft trunnion support 37 for shafts 38 and 39 is provided forward of rocket engines 33, 34, 35 and serves to support the aft end of tank/thrust structure 13 within aeroshell structure 11 via bearings 36 which, in turn, are attached to the aeroshell structure 11 by multiple ball-jointed links 40.

Figure 2:
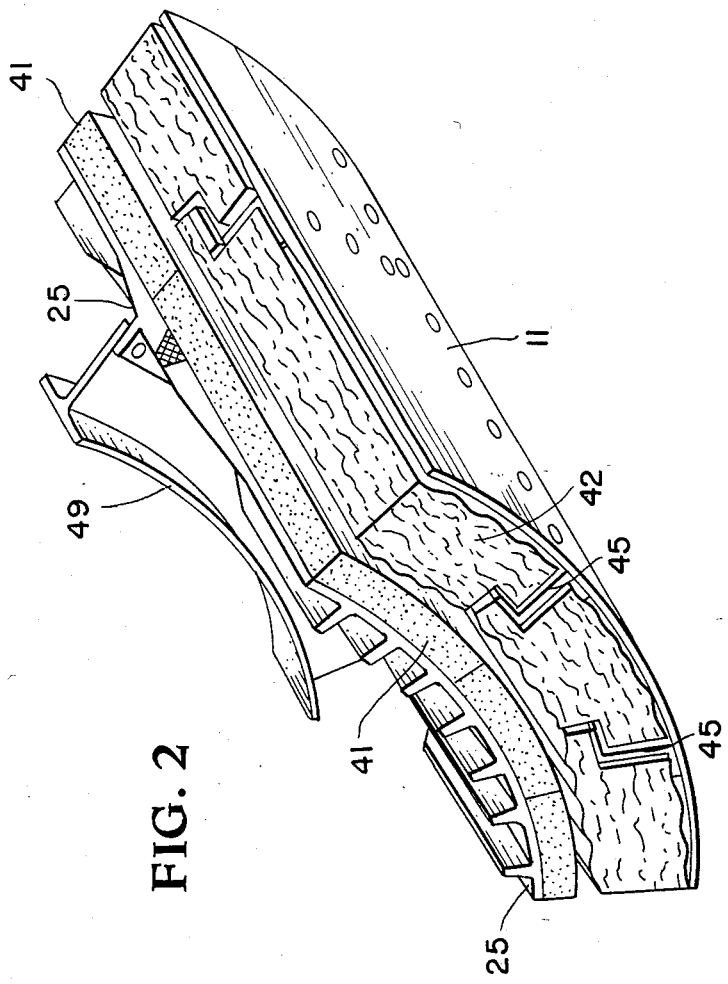
FIG. 2 is a part sectional view of the assembled aeroshell structure and tank/thrust structure shown in FIG. 1 and illustrating the insulation for the tank/thrust structure components and the insulation lining the cavity in the preferred embodiment hot aeroshell structure that receives the tank/thrust structure.

Referring now more particularly to FIG. 2, the insulated tank/thrust structure and the fibrous insulation for the interior of cavity 24 of aeroshell structure 11 are illustrated. As shown therein, the present invention is designed for cryogenic fuel systems, e.g., liquid hydrogen and liquid oxygen, and the entire tank(s) is/are provided with a cryogenic insulation. In the illustrated embodiment, a segment of tank 25 is shown and has a Kapton-aluminum-Kapton covered polymethacrylimide foam or other suitable cryogenic insulation layer 41 provided adjacent the fuel tank 25. Cavity 24 of aeroshell 11 is lined with a fibrous layer of insulation 42 spaced from the hot structure of aeroshell wall 11 via suitable structural stringers 45. By this arrangement the hot structure of aeroshell 11 provides a smooth impervious surface for all weather operational flexibility while eliminating the external thermal protection system requirement for vehicle 10.

Figure 3:
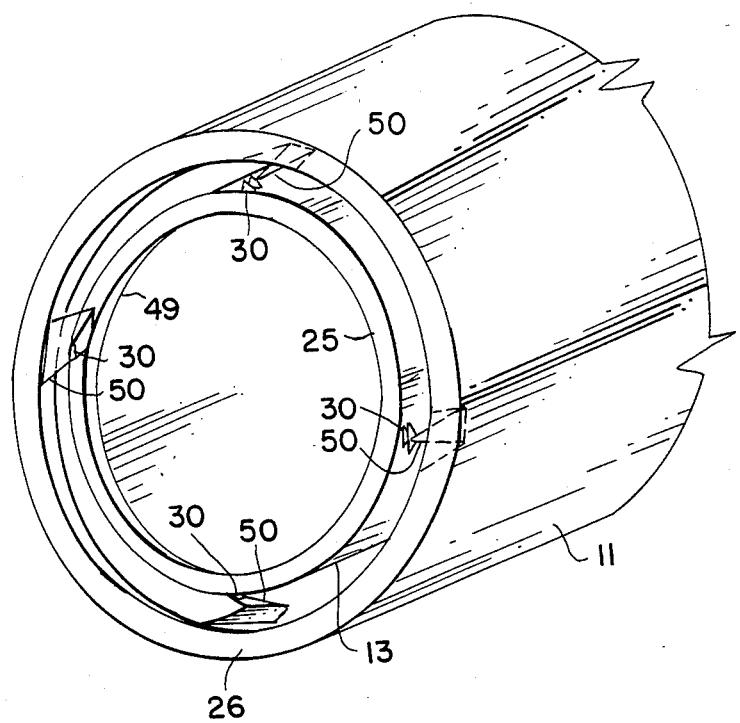
FIG. 3 is a part sectional, part schematic illustration of the aeroshell and tank/thrust structure hinged connections.
Figure 4:
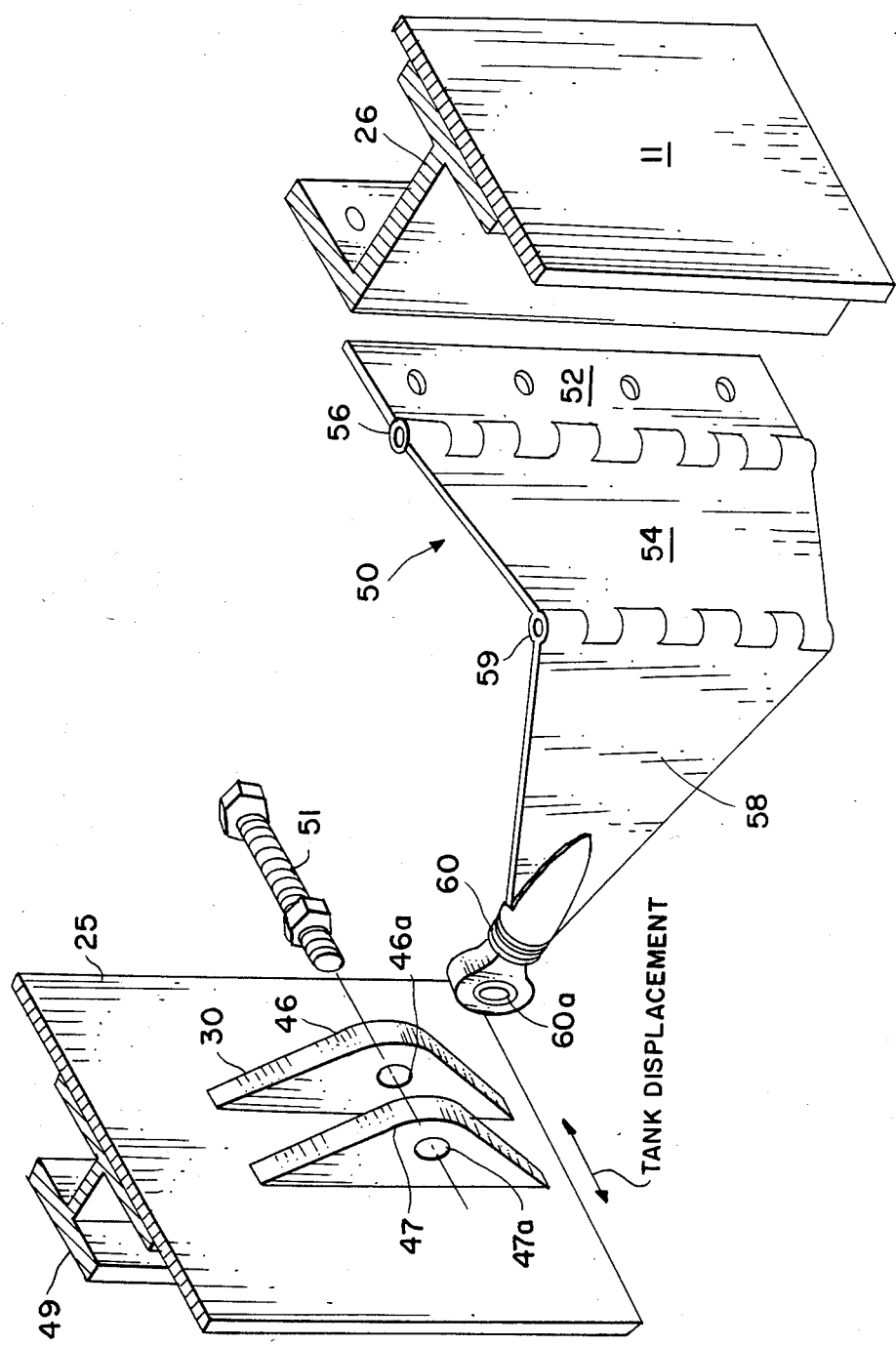
FIG. 4 is a part schematic, exploded view of one individual hinged connection between the aeroshell structure and the tank/thrust structure shown in FIG. 3.

Referring now more particularly to FIGS. 3 and 4 the details of the ball-jointed hinge supports for tank/thrust structure 13 will now be described. Although the preferred embodiment illustrated in FIG. 1, shows the use of two tanks 25 and 27, only one is shown in FIG. 3. Obviously, one, two or more propellant tanks may be employed for different flight vehicles and missions within the scope of the present invention. Also, although four hinged joint/lug arrangements are illustrated in FIG. 3, it is to be understood that any number greater than two are considered applicable for use with the present invention. As shown schematically in FIG. 3, four equally spaced lugs 30 are disposed 90° apart about the periphery of a tank structure 25 and hinge connected by hinges 50 to the integral support ring 26 within aeroshell 11.

Referring now more particularly to FIG. 4, one lug 30 and hinge, generally designated by reference numeral 50, will now be described. As discussed hereinbefore, lug(s) 30 are conventionally attached along the periphery of a tank wall, e.g., 25 and each lug consisting of a pair of spaced ears 46, 47 each having an opening 46a, 47a therethrough for receiving a bolt, pin or the like 51. The interior of tank 25 is provided with suitable I-shaped structural support rings 49. A portion of support ring 26, disposed in fixed relationship within cavity 24 of aeroshell structure 11, is shown and serves to secure hinge face plate 52 thereto via suitable bolts (not illustrated). Face plate 52 is connected to intermediate hinge plate 54 via a pivot pin, forming hinge joint 56. A connection plate 58 is also connected to intermediate plate 54 via a pivot pin forming hinge joint 59 parallel to hinge joint 56. A ball joint connection 60 is threaded or otherwise connected to connection plate 58 and provided with an exposed ball section head 60 adapted to be received between lug ears 46, 47. An opening 60a is provided through ball joint head 60 to receive the attachment pin or bolt 51 therethrough for connection to lugs 46 and 47.

This attachment between the separate aeroshell airframe 11 and the tank/thrust structure 13 is thus a novel joint which can support aero-inertially induced loads without relative motion between the aeroshell structure 11 and the integral tank/thrust structure 13, and accommodate the thermal growth between the two structures without imparting thermally induced loads. The aft attachment, as described hereinbefore, consists of a trunnion 37 which transmits the thrust load to the airframe and is free to rotate about a single transverse axis. One side of this trunnion, e.g., journal 38, is restrained from movement in the horizontal plane in a conventional manner and the other (journal 39) is allowed to slide in the horizontal plane to accommodate radial displacements between the tank wall and the airframe. This aft support transmits all loads between the airframe and integral tank/thrust structure without relative translation of the structures yet permitting rotation of the structures necessary for simple support as illustrated in the schematic side views (FIGS. 5 and 6) of the vehicle. The forward tank attachment, as described hereinabove, consists of a series of double hinged and ball-jointed supports located around the periphery of the tank/airframe interface. These forward supports are free to translate longitudinally and radially to accommodate thermal displacements between the tank wall and the airframe. Aero-inertial loads are supported by the hinge supports that have an axis parallel to the direction of the applied load, which are essentially normal to the longitudinal axis of the vehicle fuselage. The ball joints permit rotation of the airframe relative to the integral tank/thrust structure to enable simple support at this attachment, yet prevent relative translation of the structures. The relative tank contraction-expansion movement is schematically illustrated in FIG. 5, while the relative rotation at the front and rear supports due to bending caused by aero-inertial loads is schematically illustrated in FIG. 6. The tank deflection as schematically illustrated in FIG. 6 is exaggerated for clarity in illustration.

The vehicle payload bay 23 and vehicle access ports (not illustrated) serve to permit access to cavity 24 for connecting/disconnection of the lug-hinge arrangements. By this attachment of the rocket propulsion system directly to the propellant tank(s) through a conical thrust structure, a near optimum load path for the thrust is provided. Also, the preferred embodiment aeroshell structure is a hot structure which provides a smooth, impervious surface for all weather operational flexibility while eliminating a requirement for external tiles or other thermal protection systems. The described aeroshell airframe 11 is readily removed from the tank/thrust structure 13 for inspection and maintenance by disconnecting the forward hinge and aft trunnion supports and lifting the aeroshell 11 up when the vehicle is in a vertical takeoff attitude or forward when the vehicle is in a horizontal takeoff attitude while providing support of the tank/thrust structure through the payload bay 23, as well as, at the base of the rocket engines.

Although the invention has been described relative to specific embodiments thereof, it is not so limited and there are numerous modifications and variations thereof that will be readily apparent to those skilled in the art in the light of the above teachings. For example, although the illustrated embodiment of FIG. 1 employs an integral pair of tanks 25 and 27; obviously one tank (as in FIG. 3) or multiple tanks could be employed, along with a single or multiple rocket engine(s) and exit nozzle(s). Alternate embodiments of the aeroshell 11 structural arrangement include several options for the wall construction of the airframe. A hot structure wall construction is potentially the lightest airframe for lightly loaded vehicles and has more promise for all weather operational flexibility due to a smoother impervious surface. The best available hot structure wall construction presently available is the illustrated hybrid carbon-carbon external surface and packaged fibrous insulation packages between the fuselage and the cryogenic tank walls. This wall construction can withstand entry heating conditions up to 2800° F. A second hot wall construction for the aeroshell uses a superalloy and titanium honeycomb core sandwich wall construction. The honeycomb core is evacuated and provides the insulation function. However, the wall construction is limited to 1600° entry temperatures which require a more benign entry trajectory than the carbon-carbon wall construction. Several known insulated wall constructions are also feasible for use with the present invention but require an external thermal protection system to keep the airframe within its operating temperature limit. Aluminum, graphite-epoxy and graphite-polyimide airframe structures are respectively lighter wall constructions.

Other variations and modifications of the present invention are considered limited only by the scope of the appended claims and it is therefore to be understood that, within these limits, the invention may be practiced otherwise than as specifically described herein.

What is claimed as new and desired to be secured by Letters Patent of the United States is:

1. An aerospace vehicle comprising a reusable aeroshell structure and a releasably contained reusable separate integral fuel tank/thrust structure disposed within said aeroshell vehicle structure,
   connection means releasably attaching said aeroshell structure and said fuel tank/thrust structure,
   said connection means providing unrestrained thermal growth between said aeroshell structure and said integral tank/thrust structure while concurrently transmitting aero-inertial loads without relative motion between said structures.

2. The aerospace vehicle of claim 1 wherein said movable connection means comprises at least two integrally secured frame structures disposed about the periphery and spaced longitudinally within a cavity within said aeroshell vehicle structure;
   a plurality of hinges removably secured to one of said frame structures at spaced intervals thereabout;
   a plurality of spaced lugs integrally secured at said spaced intervals about the periphery of said fuel tank/thrust structure and attachments serving to connect said plurality of spaced lugs to said plurality of hinges.

3. The aerospace vehicle of claim 2 wherein each said plurality of hinges comprise a face plate fixed to said one frame structure and a pair of pivotal plates connected to said face plate via a pair of parallel hinge joint connections.

4. The aerospace vehicle of claim 3 wherein said attachments comprise ball joints integrally secured to one of said pivotal plates and pivotally secured to said lugs.

5. The aerospace vehicle of claim 4 wherein said ball joints are pivotally secured to said lugs via a pivot pin extending through said joint and said lugs.

6. The aerospace vehicle of claim 2 including a trunnion connection provided between said aeroshell structure and said integral tank/thrust structure, said trunnion connection comprising a trunnion secured adjacent the aft end of said tank/thrust structure and a bearing surface receiving said trunnion and supported by another of said frame structures adjacent the aft end of said aeroshell structure.

7. The aerospace vehicle of claim 1 including thermal insulation means disposed adjacent to said tank/thrust structure and additional thermal insulation means disposed adjacent to the cavity of said aeroshell vehicle structure to insulate said vehicle structure from said tank/thrust structure and from external environmental heating.

8. An aerospace vehicle comprising:
(a) an aeroshell vehicle body having a pair of wings,
 a canopy,
 a payload compartment, and
 an elongated internal cavity extending substantially the length of said aeroshell vehicle body;

(b) a propulsion system for said aeroshell vehicle body removably disposed within said internal cavity of said aeroshell vehicle,
said propulsion system including at least one liquid fuel tank and at least one rocket engine in operative connection with said fuel tank,
first thermal insulation means disposed adjacent to said at least one liquid fuel tank, and second thermal insulation means adjacent to said elongated internal cavity of said aeroshell vehicle body, and
connection means releasably attaching said aeroshell structure and said fuel tank.

* * * * *